Oct. 31, 1939.         L. M. TAYLOR         2,177,793
MAN-POWERED VEHICLE
Filed Sept. 26, 1936         6 Sheets-Sheet 1

INVENTOR
Lester M. Taylor
BY
ATTORNEY

Oct. 31, 1939.  L. M. TAYLOR  2,177,793
MAN-POWERED VEHICLE
Filed Sept. 26, 1936  6 Sheets-Sheet 2

INVENTOR
Lester M. Taylor
BY
ATTORNEY

Oct. 31, 1939.  L. M. TAYLOR  2,177,793
MAN-POWERED VEHICLE
Filed Sept. 26, 1936      6 Sheets-Sheet 3

INVENTOR
Lester M. Taylor
BY
ATTORNEY

Patented Oct. 31, 1939

2,177,793

UNITED STATES PATENT OFFICE 2,177,793

MAN-POWERED VEHICLE

Lester M. Taylor, Dayton, Ohio

Application September 26, 1936, Serial No. 102,708

17 Claims. (Cl. 280—264)

The present invention relates generally to vehicles and more particularly to velocipedes or like vehicles adapted for accommodating one or more operators who contribute to the power of propelling the vehicle. One of the primary purposes of my invention is to combine in one machine some of the more desirable features of the automobile together with certain other features inherent in conventional velocipedes, at the same time eliminating many of the faults of both of said vehicles and incorporating certain other features new and novel in themselves.

The general aim of the present invention is to provide a hand-powered velocipede which is characterized by lightness, ease of control, and simplicity in construction, as well as the comfort, springiness, large wheels, long wheel-base, and closed-in effect of the automobile without requiring the intricate spring system and differential gear arrangement of the automobile and its other appurtenances which stand in the way of its being developed into an inexpensive vehicle presenting the least possible resistance to the air.

The primary object of the present invention is to provide in a machine of this character, improved means whereby an operator, when seated in the vehicle, may readily propel himself in any desired direction; the motive power developed in the propelling mechanism being primarily dependent upon and derived from the physical energy available in the muscles of the human body.

A further object of the present invention is to provide in a machine of this character, means whereby the power strokes of the operator are equalized by the provision of a resilient driving connection between the driving and driven parts so as to obtain smoother and more regular driving impulses at the driving wheels.

A still further object of the present invention is to provide in a machine of this character, a combined steering and propelling mechanism, said mechanisms being mutually independent of one another so as to enable the operator to propel the machine in an exact and controlled direction.

A still further object of the present invention is to provide in a machine of this character, new and novel means for not only storing potential energy capable of being used for propelling the vehicle, but in addition, for obtaining a resilient connection between the driving and driven parts of the vehicle in order to eliminate as far as practical the influence of variations in velocity of the driving parts on the driven parts.

A still further important object of the present invention is to provide in a machine of this character, a brake mechanism for controlling the forward propulsion of the machine, said brake mechanism being so constructed and arranged that the potential energy still available in the drive system may be readily conserved when desired by the operator.

A still further object of the present invention is to provide a man-powered vehicle that is propelled substantially in the manner of the well-known racing shell in that it incorporates a longitudinally slidable seat for the operator, said seat being associated with the braking mechanism, aforesaid, in a manner such that, upon application of the brakes of the vehicle by the operator, the sliding movement of the seat is instantly stopped irrespective of the position of the operator during the power or return stroke to permit instant application of maximum braking pressure.

A still further object of the present invention is to provide a man-powered vehicle in which the release of the stored or potential energy is accomplished by the release of the braking mechanism thereby giving exact and instant control of the said stored energy at all times.

A still further important object of the present invention is to provide a man-powered vehicle incorporating an automatic speed-ratio-varying mechanism which permits the operator to set the speed ratio at its most desirable value to obtain maximum torque at the driving wheels, said mechanism being so constructed and arranged that its ratio decreases with each succeeding power stroke of the operator to thereby acquire the most desirable ratio for any given speed of the vehicle.

Among the more specific objects of the invention are to provide for easy assemblage, inspection and repair of the various parts of the machine, and especially the undercarriage, brake mechanism and "resilient shaft connection" between the driving and driven parts; to retain adjustability of the various working parts; to simplify the attachment of the working parts to the undercarriage; and to house as many unstreamlined parts as possible within the streamlined confines of the body of the vehicle.

Other features and advantages of my invention will be found in the specific construction, combination, interrelation, and coordination of the parts as will be evidenced from an inspection of the following specification and claims when read in the light of the accompanying drawings exemplifying a concrete embodiment of the invention, in which drawings:

Referring more particularly to the drawings, wherein corresponding parts are referred to by like numerals throughout the several views, the vehicle in the present preferred embodiment of my invention herein illustrated, generally comprises a light-weight frame 10 of channel construction which is supported by front driving wheels 11 and a rear wheel 12, the latter being arranged for obtaining directional control of the vehicle in a manner to be more fully described in greater detail in the description which follows. It will be particularly noted that I provide a minimum of three wheels in order to obtain a stability that does not depend upon forward velocity and/or balance of the rider or operator.

Figure 2:
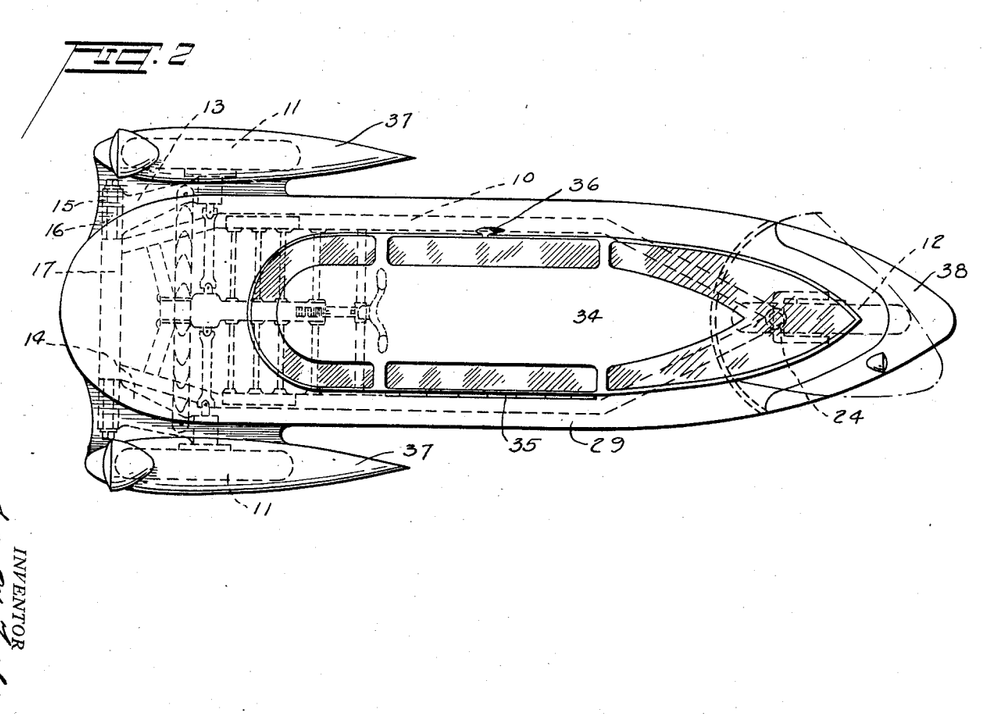
Fig. 2 is a top plan view of Fig. 1.
Figure 3:
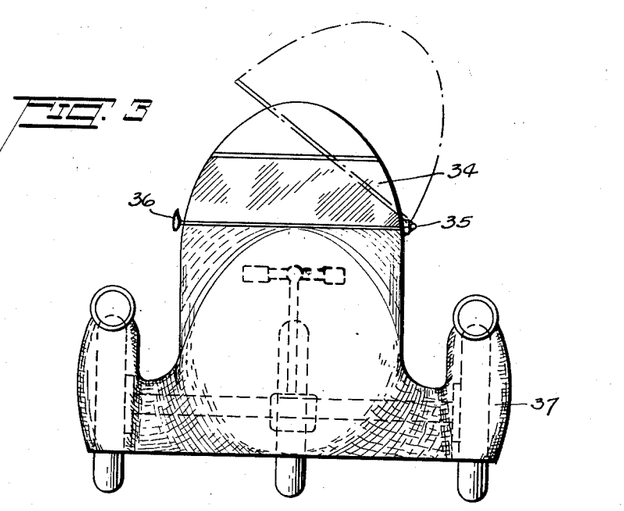
Fig. 3 is a front elevation.

As shown more particularly in Fig. 2, the driving wheels 11, which, as aforesaid, are positioned at the front end of the vehicle, are individually mounted on the rear end of swinging arms 13 and 14, respectively, each arm being provided with a front bearing portion 15 which pivots around laterally disposed spindles 16 extending outwardly relative to a front cross-brace member 17 of the frame 10. To absorb shock incident to travel of the vehicle over the ground, any suitable method of spring suspension of the undercarriage or frame 10 may be employed but in the present embodiment of the invention, for purposes of illustration only, I provide a transverse leaf spring 18, the central portion of which is securely anchored to the frame 10 while the extreme outer ends of the spring may be suitably mounted on the swinging arms 13 and 14, respectively, in any well-known manner.

Figure 1:
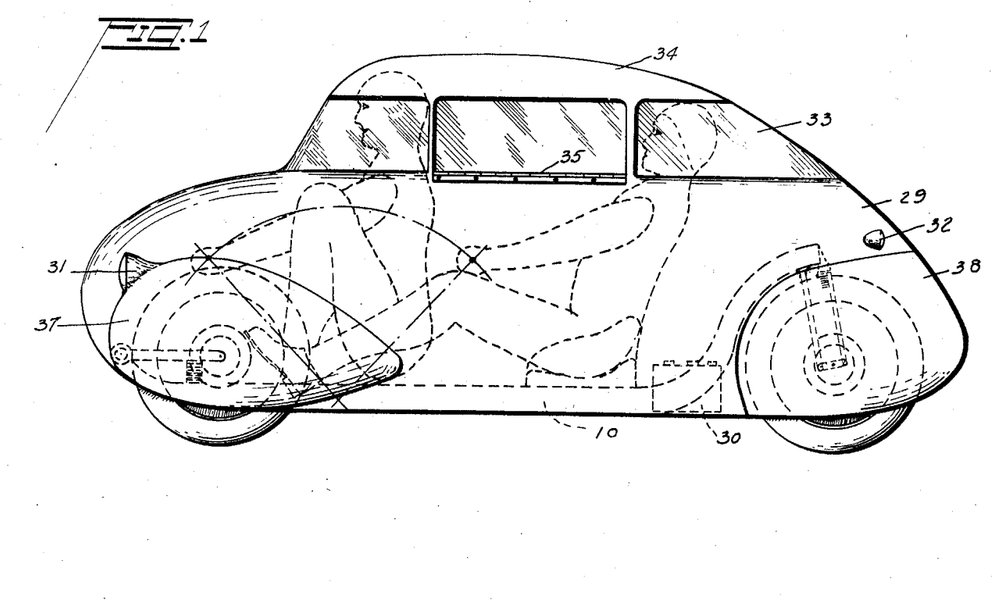
Fig. 1 is a side elevation of the present preferred embodiment of my invention.
Figures 10, 11:
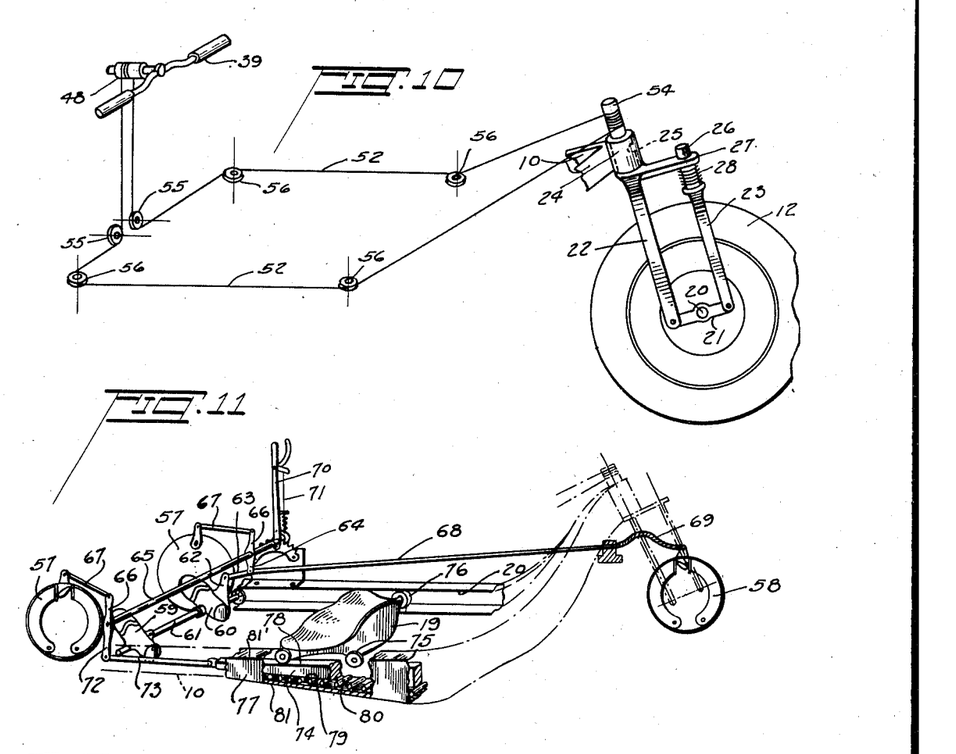
Fig. 10 is a diagrammatic view illustrating the pulley arrangement and cables used in steering the vehicle.
Fig. 11 is a diagrammatic view of the arrangement of the braking mechanism and sliding seat.

The operator of the vehicle, diagrammatically shown in two positions in Fig. 1, is supported on a sliding or rolling seat 19 shown in Fig. 11 which is constrained by guideways 20 to move backward under the action of the operator in making the initial power stroke and in moving forwardly into a position to make each succeeding power stroke. This seat is free to move longitudinally until such time, as will be described hereinafter more in detail, it becomes necessary by the exigencies of the case to apply the brakes, at which time the seat is automatically rendered immovable by a braking system, thereby permitting the operator to obtain full brake pressure on the brake assemblies.

The rear or steering wheel 12 is mounted for rotation on an axle pin 20 carried in links 21, only one of which is shown in Fig. 10. The inner end of each link is pivotally secured to the lower end of a main fork 22 while the opposite or outer ends of the said links are connected to a secondary fork 23. As shown more particularly in Figs. 2 and 10, the rearward ends of the side members of the frame 10 converge inwardly toward a common point which is coincident with the longitudinal center line of the vehicle. At the junction of the said side members I provide a bearing portion 24 for rotatably receiving therein the upper spindle portion 25 of the fork 22. The bearing portion 24 is angularly positioned on the end of the frame 10 in such a manner that, under the influence of the steering forces, the fork 22 will turn so as to direct the vehicle in the desired direction.

The secondary fork 23 at its upper end is provided with a plunger 26 which slides in a bearing guide 27 formed as an extension of the main fork 22. A coiled spring 28, surrounding the plunger 26, is interposed between the bottom end of the guide 27 and the upper end of the fork 23 and adapted for absorbing road shocks imposed upon the steering wheel 12.

An enclosure or body 29 for protection of the operator against the elements is suitably mounted on the frame 10. An electric battery 30 provides the necessary electric current for the headlights 31 and taillight 32. The body 29 has areas of vision 33 and a method of ingress or egress shown in this instance in the form of a pivoted closure portion 34 hinged as at 35. A suitable latching mechanism is provided, as shown at 36, to secure the closure portion 34 to the body 29. Preferably, the body of the vehicle and closure portion are streamlined in shape so as to offer, by their shape, the least possible resistance to the air. The central portion of the body is somewhat higher than the portion forward thereto to provide sufficient head clearance for the operator.

The front driving wheels 11 are also shown enclosed by streamlined portions 37, while the steering wheel 12 is enclosed by a secondary streamlined portion 38 which is formed as a continuation of the rear streamlined surfaces of the body 29, it being particularly noted, however, that such portion 38 is secured to and adapted to turn with the steering wheel 12. Obviously, at higher speeds a small amount of steering force will be obtained from the surface of this rear streamlined portion.

Figures 4, 5:
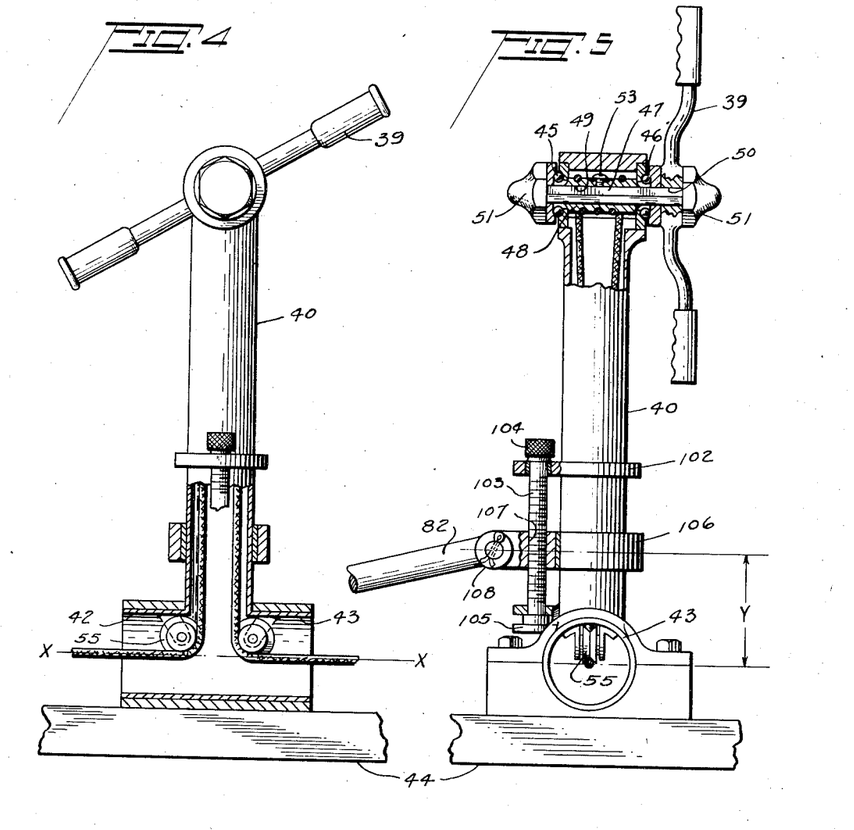
Fig. 4 is an enlarged detail view, partly in section, of the combined steering and propelling mechanism.
Fig. 5 is an end view of Fig. 4 illustrating a manually operable, speed-ratio-varying mechanism.

As shown more particularly in Figs. 4 and 5, directional control of the vehicle is obtained through the provision of a steering handle 39 rotatably mounted at the upper end of an operating lever 40 which latter is suitably mounted for fore and aft pivotal motion in lateral bearing portions 42 and 43 mounted for turning movement in a bracketed cross-support 44 of the frame. The upper end of the operating lever 40 is provided with roller bearings 45 and 46 adapted for rotatably receiving therein a cross-shaft 47 carrying a drum 48. To insure positive turning motion of the drum, upon rotation of the steering handle, the said cross-shaft 47 is squared in cross-section with the bore 49 of the drum and the bore 50 of the handle also squared and adapted to intimately engage with the said shaft. The cross-shaft 47 is secured in place by providing locking nuts 51.

The steering forces imposed upon the rear wheel 12 are transmitted by a flexible cable 52. As shown more particularly in Fig. 5, the drum 48 carried by the operating lever 40 is provided with a series of grooves around which several turns of the cable 52 are taken, the central turn being suitably secured to the drum by a set screw 53 thus giving freedom of rotation through sufficient angularity to permit proper steering of the vehicle, but preventing any slippage of the cable relative to the drum.

As shown in Fig. 10, a second drum 54, similar in shape to the drum 48, is fixedly mounted upon the upper spindle portion 25, heretofore mentioned, to effect rotation of the steering wheel 12. A series of pulleys, generally indicated by the numerals 55 and 56, are provided over which the cable is guided in effecting directional control of the steering wheel. The two ends of the cable 52 are threaded through the hollow operating lever 40 in the manner indicated in Fig. 5 and pass around the guide pulleys 55 mounted in the bearing portions 42 and 43 of the operating lever 40. These pulleys are disposed in said portions in a manner such that the ends of the cable leave the operating lever column on its center of pivotation represented by the line $x$—$x$. This is done to prevent slackness or binding in the steering mechanism upon movement of the operating lever in a fore and aft direction. Since, as hereinabove described, the steering handle and operating lever are mutually independent in action, the operator may move the operating lever 40 fore and aft, thus storing potential energy in the drive system to be hereinafter described. He may also rotate the steering handle 39 about its axis of rotation, thus operating, through the steering linkage, the steering fork 22 and wheel 12. Obviously, the two movements may be combined so that the operator may simultaneously propel the vehicle and effect directional control.

As shown more particularly in Fig. 11, the driving wheels 11 and steering wheel 12 are provided with individual but interconnected brake assemblies, generally indicated by the numerals 57 and 58, respectively, said brakes not only serving the purpose of stopping the motion of the vehicle but, as will be explained in greater detail later, conserving the potential energy still remaining in the driving system. Two pedals 59 and 60 are provided, the pedal 59 being fixed in suitable angularly disposed position for accommodation of the operator's one foot, while the other pedal 60 is mounted so as to be rotatable about a rod 61 suitably secured transversely of the vehicle frame. Fixed to the pedal 60 is a lever 62 which transmits the braking force through link 63 to a primary lever 64 mounted on a cross-shaft 65, said shaft incorporating secondary levers 66 which connect with links 67, the latter connecting directly to the front brake assemblies 57. A rear brake link 68 connected at its forward end to the primary lever 64 and at its rear end to the rear brake assembly 58 through a flexible cable connection 69 transmits the braking force to the steering wheel 12. For purposes of convenience and added safety a hand brake rod 70 provided with a ratchet mechanism 71 is suitably connected to the cross-shaft 65. Another lever 72 depending from the one end of the cross-shaft 65 is connected through link 73 with a brake block 74 for stopping the motion of the operator's seat simultaneously with the application of braking pressure to the vehicle wheels.

As shown in Fig. 11, the seat 19, heretofore mentioned, is provided with sets of oppositely disposed rollers 75 and 76 which run in the guideways 20. The one guideway is formed by providing an extension 77 in the bottom of the channel portion of the frame 10 to accommodate the brake block 74. This brake block is formed with an upper runway 78 along which the one set of rollers 75 is adapted to roll. The lower end of the brake block is formed with a wedging surface 79 which rests on anti-friction rollers 80 interposed between said block and the lower surface 81 of the extension 77. It will be noted that the lower surface 81 is so angularly disposed with respect to the upper surface 81' of the frame that when the brake block is moved forwardly a wedging action takes place to lock the rollers 75 between the surface 78 of the block and the top surface 81' of the frame. Thus, a means is provided for stopping movement of the operator's seat simultaneously with the application of braking pressure to the brake assemblies, and since the braking pressure is dependent upon the force the operator can place on the brake pedals and the reaction on the back of the seat, the maximum force that the operator is capable of exerting is thus available, giving maximum safety and quick action.

The drive system employed for effecting forward propulsion of the vehicle is illustrated in Figs. 2, 5, 6 and 12. As shown in Fig. 5, the operating lever 40 has pivotally connected thereto one end of a pitman 82, the opposite end of the pitman being connected to a crank arm 83, shown in Fig. 6, by the pin 84. This crank arm is formed integrally with a driving gear 85 rotatably mounted in a gear box 86 that is positioned centrally of and carried by the frame 10, as indicated in Fig. 2. The driving gear 85 meshes with a pinion 87, the latter being adapted to transmit driving impulses to a system of so-called "torsion shafts" wherein rotation of the driving wheel is obtained. Various types of flexible drive or propelling mechanisms embodying torsional deflecting shafts have been proposed, some of which embody yielding spring elements therein and others consisting primarily of a drive shaft of relatively small diameter secured in such a manner as to provide a relatively long extended portion which is adapted to torsionally flex under load.

The present invention is directed to the latter type of drive mechanism and embodies generally a plurality of torsionally deflecting shaft members and adapted to engage drive shafts, gears, or other driven members at their free ends.

Figure 12:
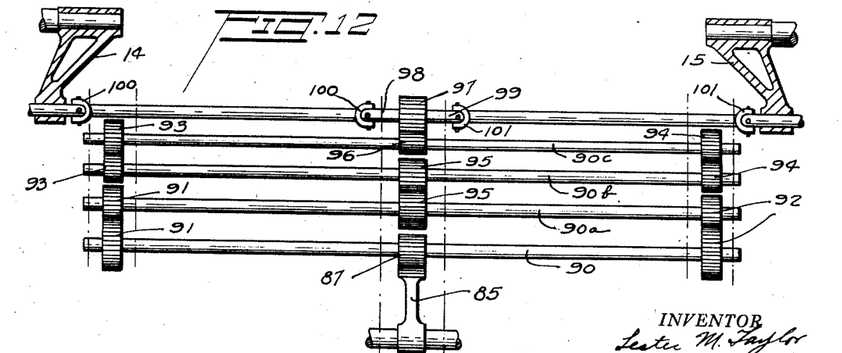
Fig. 12 is a diagrammatic view of the torsionally flexible members used in storing potential energy.

As shown more particularly in Fig. 12, the pinion 87, through overrunning clutches 88 and 89, is connected to the driving end of a torsional deflecting shaft system, which latter consists of shaft members 90, 90a, 90b, and 90c arranged in parallel relation with respect to one another. The outer ends of the shafts 90 and 90a are operatively connected to one another by means of pinion sets 91, 91 and 92, 92, while the outer ends of the shaft members 90b and 90c are operatively connected to one another by means of pinion sets 93, 93 and 94, 94. Operative connection between the shaft members 90a and 90b, is obtained through the pinion set 95, 95. The central portion of the shaft member 90c carries a pinion 96 which meshes with the driven gear 97. This gear carries stub shafts 98 and 99 which, through the medium of universal joint couplings 100, 100 and 101, 101, drive the wheels.

From the foregoing detailed description of the drive system, it will be obvious that the sum of the torsional forces that are exerted on the torsionally deflected shaft members will be available at the stub shafts 98 and 99 for effecting their rotation to cause the drive wheels 11 to turn in the desired direction and propel the vehicle forwardly.

Figure 6:
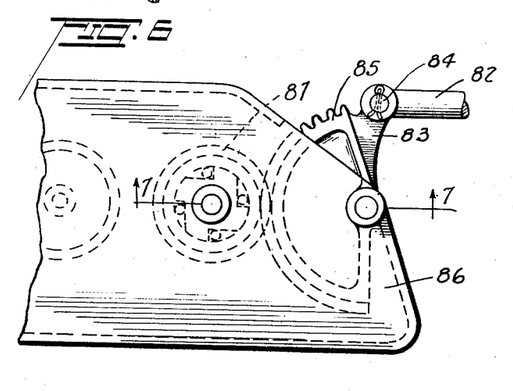
Fig. 6 is a side elevation of the gear box and driving end of the torsion shaft arrangement.
Figure 7:
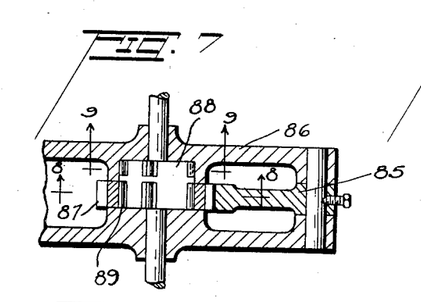
Fig. 7 is a sectional view taken on the line 7—7 of Fig. 6.
Figure 8:
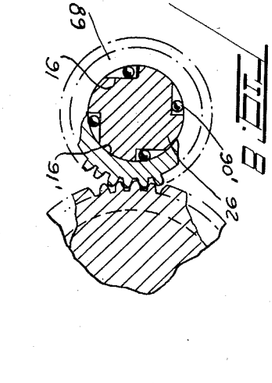
Fig. 8 is a sectional view taken on the line 8—8 of Fig. 7.
Figure 9:
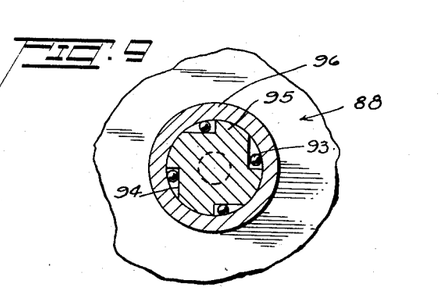
Fig. 9 is a sectional view taken on the line 9—9 of Fig. 7.

As shown in Fig. 6, movement of the pitman 82 rearwardly, or to the right as viewed in Fig. 6, turns the driving gear 85 in a clockwise direction. Since a force is being exerted on the torsional deflecting shaft members tending to twist them torsionally, it becomes necessary to provide the overrunning clutches 88 and 89 shown in enlarged cross-sectional detail in Figs. 8 and 9. Thus, upon any tendency of the torsional deflecting shaft members 90, 90a, 90b, and 90c to untwist upon completion of a power stroke, the clutch 88 automatically locks the driving end of the shaft system in a fixed position relative to the frame 10 of the vehicle, thus enabling the stored energy to continue to do useful work in driving the vehicle so long as the brakes are not set and at all times under the complete control of the operator.

At the same time, it is necessary to provide a second one-way clutch 89 which enables the operator to obtain a new purchase on the torsional deflecting system at each succeeding power stroke. The clutch 89 (shown in Fig. 8) is designated "the operating clutch" while the first-mentioned clutch 88 (Fig. 9) is designated "the locking clutch". To best explain the operation of the two clutches, let it be assumed that the vehicle is at rest, the operating lever 40 is in the forward position, and the operator desires to start the vehicle. As he pulls rearwardly on the operating lever, the "operating clutch", through the wedging action of the rollers 99' acting in pockets 91 formed in clutch member 92 and the race 97' formed in the pinion 87, automatically engages and the driving torque forces exerted through the torsionally deflected members are utilized in turning the driving wheels. At the end of the power stroke, because of the torsion in the torsionally deflected members, the said members would tend to unwind and all of the energy stored would be lost. Thereupon, the "locking clutch" comes into operation, locking the driving end of the torsionally deflected members to the frame of the vehicle through the wedging action of the rollers 93 acting in pockets 94 formed in the clutch member 95 and the collar 96 forming an integral part of the gear box 86, thus allowing the stored energy to continue to drive the vehicle while the operator moves the operating lever forwardly to make the next power stroke. As the operator moves the lever 40 toward the front, the "operating clutch" releases and the operating lever is free to rotate about its bearing supports until the said "operating lever" is in the forward position again. At this time, the operation of the clutches is simultaneously reversed, the "operating clutch" locking or rearranging and the "locking clutch" disengaging, thus enabling another power stroke to be made and additional energy stored in the driving system.

Thus, it will be seen from the above description of my invention that the flexible drive elements embodied therein provide an efficient, durable, and compact driving mechanism which is applicable to a variety of uses but particularly to the driving of those classes of vehicles where the driving stresses are especially severe and it is essential to provide flexible members intermediate the driving and driven parts. At the same time the brake mechanism hereinabove-described serves a new and useful purpose in that it not only stops the forward motion of the vehicle but also prevents the unwinding of the torsionally deflecting driving members at the driven end, thus conserving the potential energy available in the system. This principle is particularly desirable in congested traffic districts where traffic lights are used; that is to say, the operator, in bringing the vehicle to a stop, will necessarily apply the brakes and, while waiting for the proper signal, can actuate the operating lever, thus storing additional energy in the drive system. Immediately the go-ahead signal is received, he releases the brakes and the vehicle will move forwardly under the force of the potential energy then stored in the system. At the same time it will be apparent that the vehicle is still under the control of the operator in that the stored energy can be smoothly and exactly released by varying the pressure on the brake pedals while, if it becomes necessary to stop again, the means are directly available at the touch of his foot. At the same time, additional power can be stored in the drive system by making as many intervening power strokes as are desired. When once underway, greater travel in the mechanism can be obtained through the medium of a variable transmission device to be described later, and the speed can be increased in proportion to the ratio of movement of the operating lever. This means that a high torque and low ratio are available at starting, while underway the mechanism will have a high ratio and low torque for any given operating force thereby providing exactly for the instant requirements of the vehicle.

In order to obtain a variable ratio between the operating lever and the driving wheels, I provide a collar 102, shown in Fig. 5, which is fixed on the operating lever 40. This collar is provided with a bearing portion in which is rotatable a rod 103 provided at its upper end with a hand knob 104. The lower end of this rod is freely rotatable in an extension 105 carried at the lower end of the operating lever. A second collar 106 interposed between the collar 102 and the extension 105 is slidably mounted on the operating lever. This collar is provided with a forward threaded portion 107 through which is threaded the rod 103 heretofore mentioned. The pitman 82 for operating the drive system is pivotally connected to the collar 106 as indicated at 108.

Obviously, rotation of the rod 103 will effect a movement of the collar 106 up or down, depending upon the direction of rotation of the rod 103 and, in so doing, the dimension "Y" will be increased or decreased and a consequent change in the angular disposition of the pitman relative to the operating lever will be obtained, giving, in effect, a variable ratio transmission between the operating lever and the driving wheels at the will of the operator.

While the drawings show a continuously variable mechanism, it is to be understood that the same or similar results can be obtained by a transmission having gear combinations of various ratios as are used on automobiles of today.

Figures 13, 14, 15, 16:
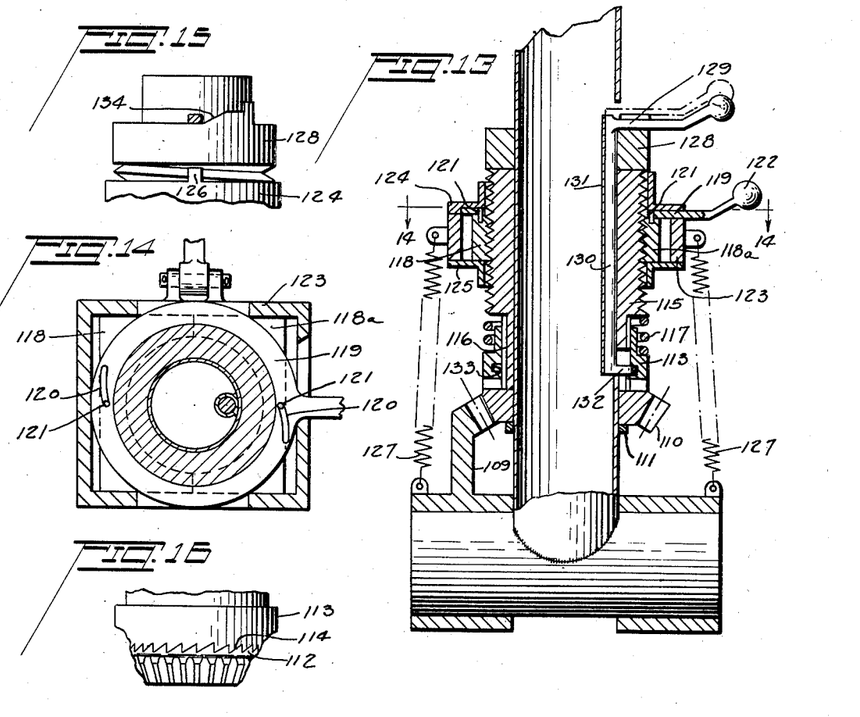
Fig. 13 is a sectional view of a modified form of speed-ratio-varying mechanism which operates automatically.
Fig. 14 is a sectional view taken on the line 14—14 of Fig. 13.
Fig. 15 is a detail view of the upper end of the mechanism shown in Fig. 13.
Fig. 16 is a detail view of the gear ratchet arrangement shown in Fig. 13.

Fig. 13 illustrates a modification of a variable ratio mechanism illustrated in connection with Fig. 5.

Under ordinary circumstances the operator will have many things to occupy his attention when driving in present day traffic so that the addition of an automatic speed ratio varying mechanism will be a worthwhile advantage.

The provision of such a mechanism permits the operator to set the speed ratio at its best value for the greatest torque at the wheels and with each succeeding power stroke the ratio decreases, thus giving the most desirable ratio for any given speed of the vehicle.

One method of accomplishing this is shown in Fig. 13 wherein I provide a beveled gear 109 which is fixed to the one bearing support of the operating lever. This gear meshes with a second beveled gear 110 rotatably mounted upon the operating lever of the vehicle. A collar 111 welded or otherwise suitably secured to the operating lever locates the gear 110 with relation to said lever.

The gear 110 is provided at its upper end with clutch teeth 112 so arranged thereon that drive will lie only in one direction. A spring-loaded clutch member 113 is provided at its lower end with clutch teeth 114 which mate with the clutch teeth 112 of the gear 110. This clutch member is operatively connected to the shank end of a screw threaded sleeve member 115 by means of complemental spline portions, generally indicated by the numeral 116, thus allowing the clutch member 113 to move longitudinally with respect to the sleeve member 115. A spring 117 interposed between a lower shouldered portion of the sleeve member 115 and the inner flanged end of the clutch member 113 maintains the latter in clutching engagement with the beveled gear 110.

Fitted on the sleeve member 115 is a split nut, the two complemental half portions of which are indicated by the numerals 118 and 118a. These half portions are controlled by operation of a rotatable camming plate 119 which is provided with oppositely disposed camming slots 120. Pins 121 projecting from the upper end of each half portion of the nut are engaged by the slots 120. The plate 119 has a lever extension 122 provided with a hand-grip to permit rotation of the plate when desired and thereby move the complemental portions 118 and 118a into or out of engagement with the threads and the sleeve member 115.

The two portions of the split nut are contained within a suitable holding member 123, the latter incorporating an upper plate 124 and a lower plate 125. The upper plate is provided with a projecting portion 126.

Coiled springs 127 interposed between the holding member and operating lever supports exert a downward pull on the split nut. The pitman of the drive mechanism is pivotally connected to the holding member 123 as shown in Fig. 14.

A collar 128 fitted on the operating lever 40 prevents endwise movement of the sleeve 115.

To permit disengaging of the clutch mechanism, I provide a disengaging lever 129, the bearing portion of which, indicated by the numeral 130, is elongated and extends through a suitable journal portion 131 formed in the operating lever. The lower portion of the lever 129 is formed with a dog 132 which operates in an annular groove 133 formed in the clutch member 113 heretofore mentioned. A camming surface 134 formed on the upper end of the collar 128 serves to lift the disengaging lever 129 when the latter is rotated manually about its axis of rotation.

The operation of the automatic ratio varying mechanism is as follows: Upon pushing the operating lever 40 forwardly, the gear 110, being connected to the sleeve member 115 through the spring-loaded clutch member 113, effects a turning movement of the said sleeve member and a consequent upward movement is imparted to the holding member 123 caused by the travel of the two half portions of the split nut along the sleeve member. Upon the return power stroke, the clutch member 113 ratchets, thus accomplishing no further change in the ratio of the mechanism during the return power stroke. At the top of the travel of the nut the projection 126 strikes the lever 129 and lifts it and, in so doing, the clutch member 113 is automatically disengaged from the gear 110. When this is accomplished, no further change in ratio is obtained. It will be further noted that at any time desired the ratio of the mechanism may be fixed at any lower or intermediate value by rotating the disengaging lever 129 manually, rotation thereof effecting a disengaging of the clutch member 113 from the gear 110 through the camming action of the lever 129 on the camming surface 134.

Whenever the operator desires to effect a change in the ratio, this same may be accomplished by a rotation of the cam plate 119, operation of which moves the half portions 118, 118a of the nut from engagement with the threads of the sleeve member 115. Under the action of the coiled springs 127, the entire unit is pulled to its lowermost position. Thereafter, the cam plate may be rotated into its normal position, thus allowing the half portions of the nut to reengage with the threads of the sleeve member.

In operation, the mechanism being at the lower position will automatically start to function and with each succeeding stroke the holding member 123, together with the split nut, will be moved upwardly to effect a change in ratio until the limit of the action is reached when there will be no further movement of the holding member and the speed of the vehicle will be at its maximum. When the vehicle is brought to a stop by the operator, he may, if he so desires, rotate the cam plate 119. In so doing, the holding member 123, through the action of its return springs, drops to the starting position and the greatest torque is available when it is most needed in order to start the vehicle.

Figure 17:
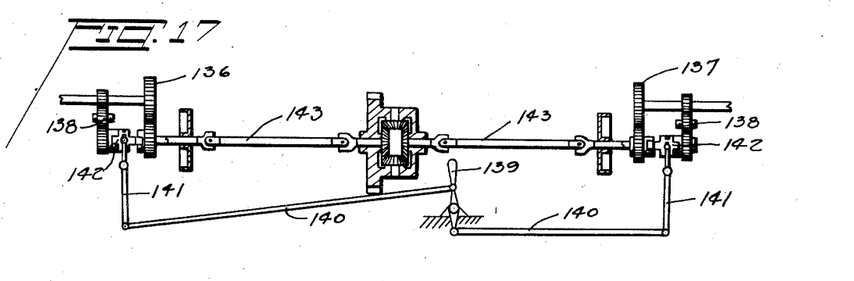
Fig. 17 illustrates a reversing feature for the driving wheels of the vehicle.

While the discussion thus far has concerned a vehicle capable of accommodating a single operator, it is readily conceivable to provide a vehicle capable of carrying any reasonable number of operators. They are referred to as "operators" since the amount of power available in the human system is definitely limited; therefore, the additional persons should be operators as distinguished from passengers. With the addition of other operators, the combined weight of the vehicle and passenger load becomes so high that the vehicle can not be readily lifted. Therefore, the addition of a reversing feature shown in Fig. 17 becomes advantageous. In order to apply a reversing feature, the brake assemblies are removed from the drive wheels and placed on the drive shafts ahead of the transmission and the wheels. As shown in Fig. 17, the reversing transmission is indicated by the two trains of gears 136 and 137 and in which the reversing feature is taken care of by the idler gears 138, while the choice of direction is controlled by the lever 139 which, through links 140, operates the levers 141, these levers, in turn, operating the clutch throw-out members 142 which are keyed to the drive shafts 143 for driving the wheels.

It is thought that the construction, operation and advantages of this invention will be clearly understood without a more detailed description thereof. It is desired, however, to point out that the present embodiment of the invention has been disclosed merely by way of example and in practice attains the objects enumerated as desirable in the statement of the invention and the foregoing description. It will be apparent to those skilled in the art that numerous changes in the details of construction and in the combination and arrangement of the several parts may be resorted to, without departing from the spirit or scope of the invention as hereinafter claimed or sacrificing any of its advantages.

Having thus described my invention, what I claim as new and desire to secure by Letters Patent is:

1. The combination in a vehicle having driving wheels a steering wheel and a framework supported thereon of a driving system for propelling said vehicle comprising a driving member a driven member for rotating said driving wheels, a plurality of interconnected torsionally flexible shaft members interposed between said driving and driven members, an operating lever pivotally mounted on said framework for oscillation in a vertical plane, said lever being operatively connected to said driving member in a manner such that upon oscillation of said lever said shaft members are torsionally deflected to store energy in said system available in moving said driving wheels, and a braking system for controlling rotation of said members in one direction and for preventing rotation thereof in the opposite direction to thereby store energy therein and control the speed of said driven member 2. The combination in a vehicle having driving wheels, a steering wheel and a framework supported thereon, of a drive system for propelling said vehicle comprising a driving member, a driven member for rotating said driving wheels, a plurality of interconnected torsionally flexible shaft members interposed between said driving and driven members, and an operating lever pivotally mounted on said framework for fore and aft movement and adapted for moving said driving member, said lever being positively connected to said shaft members upon movement of said lever in one direction to torsionally deflect said shaft members and store potential energy in said system but being automatically disconnected from said shaft members upon movement in the opposite direction, and a braking system controlling the speed of said vehicle and for simultaneously conserving the stored energy in said driving system.

3. The combination in a vehicle having driving wheels, a steering wheel, and a framework supported thereon, of a drive system for propelling said vehicle comprising a driving member, a driven member for rotating said driving wheels, a plurality of interconnected torsionally flexible shaft members interposed between said driving and driven members, and an operating lever pivotally mounted on said framework for fore and aft movement and adapted for moving said driving member, said lever and driving member being operatively connected to said shaft members in such a manner that upon rearward movement of said lever said shaft members will be torsionally deflected to store potential energy in said system, said driving member being automatically released from engagement with said shaft members upon movement of said lever in a forward direction.

4. The combination in a vehicle having driving wheels, a steering wheel and a framework supported thereon, of a driving mechanism for propelling said vehicle comprising a reciprocal driving element, a plurality of interconnected shaft members adapted for being torsionally flexed to store potential energy therein which is available for effecting rotation of said driving wheels, clutch means at the driving end operatively connecting said driving element with said mechanism in such a manner as to torsionally deflect said shaft members upon movement of said driving element in one direction, and to prevent unwinding of said shaft members upon movement of said reciprocal element in the opposite direction, and means at the driven end of said drive mechanism for conserving the energy stored therein.

5. The combination in a vehicle having driving wheels, a steering wheel and a framework supported thereon, of a driving mechanism for propelling said vehicle comprising a reciprocal driving element, a plurality of interconnected shaft members adapted for being torsionally flexed to store potential energy therein which is available for effecting rotation of said driving wheels, clutch means at the driving end operatively connecting said driving element with said mechanism in such a manner as to torsionally deflect said shaft members upon movement of said driving element in one direction, and to prevent unwinding of said shaft members upon movement of said reciprocal element in the opposite direction, and brake means at the driven end of said mechanism for controlling the speed of said driving wheels and for simultaneously conserving the energy stored in said drive mechanism.

6. The combination in a vehicle having driving wheels, a steering wheel and a framework supported thereon, of a driving system for propelling said vehicle comprising, a driving member, a driven member, and a plurality of interconnected shaft members operatively connected to said driving and driven members and adapted for being torsionally flexed to store energy therein available in driving said wheels, clutch means interposed between said framework and said shaft members to prevent unflexing of the latter at the driving end, and brake means operatively connected to said driven member for controlling the speed of said driving wheels and for simultaneously conserving the energy stored in said driving system.

7. The combination in a vehicle having driving wheels, a steering wheel and a framework supported thereon, of a driving mechanism for propelling said vehicle comprising a driving member, a driven member, and a plurality of interconnected shaft members adapted for being torsionally flexed to store energy available in driving said wheels, an operating lever mounted for oscillatory movement fore and aft in said vehicle, said lever imparting rocking motion to said driving member, a pair of clutching members, one of said clutching members being interposed between said driving member and driving end of said shaft members and the other between the framework and the driving end of said shaft members whereby upon movement of said lever in one direction a driving impulse is imparted to said driving member to effect a torsional flexing of said shaft members and upon movement of said lever in the opposite direction unflexing of said shaft members at the driving end is prevented.

8. The combination in a vehicle having driving wheels, a steering wheel, and a framework supported thereon, of a seat movable longitudinally of said framework, a drive mechanism for propelling said vehicle comprising, a driving and a driven member and a plurality of interconnected torsionally flexible shaft members interposed between said members for the storage of energy available in obtaining rotation of said driving wheels through said driven member, and brake means for controlling the speed of said vehicle and for simultaneously conserving the energy stored in said driving mechanism, said brake means being operatively connected to said seat in a manner such as to arrest the movement thereof upon application of braking pressure.

9. The combination in a vehicle having driving wheels, a steering wheel, and a framework supported thereon, of a drive mechanism for propelling said vehicle comprising, a driving member, a driven member, and a plurality of interconnected shaft members torsionally resilient to such an extent as to yield in response to the driving impulses imparted thereto by said driving member and store potential energy available in driving said vehicle, an operating lever pivotally mounted for oscillatory movement fore and aft in said vehicle, said lever being adapted to impart rocking motion to said driving member, and means interposed between said operating lever and said driving member and operative in response to the movement of said lever for automatically obtaining variations in the rocking action of said driving member for a given stroke of said operating lever.

10. The combnation in a vehicle having driving wheels, a steering wheel, and a framework supported thereon, of a drive mechanism for propelling said vehicle comprising a driving member, a driven member, and a plurality of interconnected shaft members torsionally resilient to such an extent as to yield in response to the driving impulses imparted thereto by said driving member and store potential energy available in driving said vehicle, an operating lever pivotally mounted for oscillatory movement fore and aft in said vehicle, said lever being adapted to impart rocking motion to said driving member, and means interposed between said operating lever and said driving member and operative in response to the movement of said lever for automatically varying the ratio of rocking action to stroke of said lever over a given range.

11. The combination in a vehicle having driving wheels, a steering wheel, and a framework supported thereon, of a drive mechanism for propelling said vehicle comprising a driving member, a driven member, and a plurality of interconnected shaft members torsionally resilient to such an extent as to yield in response to the driving impulses imparted thereto by said driving member and store potential energy available in driving said vehicle, an operating lever pivotally mounted for oscillatory movement fore and aft in said vehicle and adapted for imparting rocking motion to said driving member, and a speed ration varying mechanism carried by said operating lever and operative in response to the movement of said lever for automatically varying the ratio of angular motion of said driving member for a given stroke of said operating lever over a given range.

12. The combination in a vehicle having driving wheels, a steering wheel, and a framework supported thereon, of a drive mechanism for propelling said vehicle comprising a driving member, a driven member, and a plurality of interconnected shaft members torsionally resilient to such an extent as to yield in response to the driving impulses imparted thereto by said driving member and store potential energy available in driving said vehicle, an operating lever pivotally mounted for oscillatory movement fore and aft in said vehicle and adapted for imparting rocking motion to said driving member, and a speed ratio varying mechanism carried by said operating lever for automatically varying the ratio of angular motion of said driving member for each succeeding power stroke of said operating lever over a given range.

13. The combination in a vehicle as set forth in claim 12, said last-mentioned mechanism incorporating locking means for maintaining the ratio of the parts at any desired value within the given range.

14. The combination in a vehicle as set forth in claim 12, said last-mentioned mechanism incorporating manually operable locking means for maintaining the ratio of said parts at any desired value within the given range.

15. The combination in a vehicle as set forth in claim 12, said last-mentioned mechanism incorporating a manually operated spring-controlled mechanism operating to automatically reduce the ratio of angular rocking motion of said driving member for a given stroke of said operating lever when desired.

16. In a vehicle of the character described, a vibrating driving member, a driven member, propelling means operatively connecting said driving and driven members including a plurality of interconnected torsionally flexible rotating shaft members, means for converting the vibratory motion of said driving member into a unidirectional movement of said shaft members and brake means for retarding rotation of said shaft members in one direction and for preventing rotation thereof in the opposite direction to thereby store energy therein and control the speed of said driven member.

17. In a device of the class described a seat for the operator, a driven wheel, mechanism for driving said wheel including a rotating part capable of storing kenetic energy and manually operable means for intermittently applying a load to said part, means to prevent restoring of energy from said part to said manually operable means and brake means operatively connected to said seat and said wheel to simultaneously retard movement of said wheel and said seat.

LESTER M. TAYLOR.